United States Patent [19]

Gindler

[11] 3,754,865

[45] Aug. 28, 1973

[54] COLORIMETRIC DETERMINATION OF CALCIUM IN BIOLOGIC FLUIDS

[75] Inventor: E. Melvin Gindler, Rockford, Ill.

[73] Assignee: Pierce Chemical Company, Rockford, Ill.

[22] Filed: Jan. 5, 1972

[21] Appl. No.: 215,638

[52] U.S. Cl. .............................................. 23/230 B
[51] Int. Cl. ............................................. G01n 33/16
[58] Field of Search .................... 23/230 B, 253 TP; 252/408

[56] References Cited
UNITED STATES PATENTS
3,457,045   7/1969   Fraguada........................... 23/230 B

OTHER PUBLICATIONS

Belcher et al., New Methods of Analytical Chemistry, 2nd ed., 1964, Reinhold Pub. Co., pp. 46, 47, relied on.

Srivastava et al., Chem. Abstr. 71, 119209 f (1969).

Chauhan et al., Analytical Biochem. 32, 70–80 (1969)

Primary Examiner—Morris O. Wolk
Assistant Examiner—R. M. Reese
Attorney—C. Frederick Leydig, Thomas E. Currier et al.

[57] ABSTRACT

Methylthymol blue dye in colorimetrically analyzing a biologic fluid such as blood serum for calcium content. Analysis can be accomplished in the presence of proteins, phosphates and bilirubin. 8-Quinolinol can be used to bind magnesium without an accompanying adverse effect on the measurement of calcium concentration. Color stable aqueous solutions of the dye are also provided as well as color stability of the calcium-dye complex during analysis.

28 Claims, No Drawings

COLORIMETRIC DETERMINATION OF CALCIUM IN BIOLOGIC FLUIDS

BACKGROUND OF THE INVENTION

The present invention relates to the analysis of biologic fluids and, more particularly, to the colorimetric determination of the calcium content in blood serum and the like.

Colorimetric methods are widely used for determining the concentration of various elements such as calcium and magnesium in biologic fluids such as blood. The methods usually involve adding a reagent to the fluid which forms a colored complex with the element to be detected. The complex absorbs light at a characteristic wave length. By exposing a sample of the fluid containing the complexed reagent to a light source of the characteristic wave length and thereafter measuring the degree of light absorption, the content of the element in the biologic fluid can be simply determined from a calibration graph constructed from absorbance measurements made on standard reagent dye solutions containing known concentrations of the element. Reagents forming complexes with calcium which have been used in determining the calcium concentration in biologic fluids include o-cresolphthalein complexone, sodium alizarinsulfonate, and sodium rhodizonate.

One of the problems encountered in determining calcium concentration in biologic fluids by colorimetric techniques is the effect on the absorption spectrum of ingredients such as serum proteins, phosphates, magnesium and bilirubin normally present in such fluids. Serum proteins and phosphates tend to bind calcium, thus lowering the quantity of calcium complexed with the reagent dye. The colorimetrically determined apparent quantity of calcium is then lower than that actually present. Magnesium complexes with many dyes give an absorption spectrum similar to the calcium complex. The colorimetric determination then gives a result based on the combined concentrations of calcium and magnesium. Bilirubin itself, in the concentrations present in normal or abnormal (e.g., jaundiced) serum, absorbs light at a wave length close to that of maximum absorbance of many calcium-dye complexes. Thus, the presence of bilirubin can interfere with the accurate colorimetric determination for calcium.

In order to overcome the problems associated with the presence of proteins and bilirubin, the biologic fluid can be subjected to dialysis to remove these ingredients prior to the colorimetric determination of calcium concentration. This, of course, is time consuming and can lead to added expense as well as introduce potential errors in the subsequent determination of calcium concentration. The potentially adverse effect of magnesium present in the fluid can be diminished by adding a reagent to the fluid which has a stronger affinity for complexing magnesium than does the reagent dye. 8-Quinolinol has been used for this purpose. With this approach, it is necessary that a reagent dye be used which can compete effectively with 8-quinolinol for calcium.

Accordingly, a principal object of the present invention is to provide an operationally simple and rapid colorimetric method for accurately determining the calcium concentration in biologic fluids which can be accomplished in the presence of serum proteins, phosphates, and bilirubin. A closely related object is to provide a method as called for in the principal object wherein the reagent dye used has a very strong affinity for calcium and permits the use of magnesium complexing agents without a significant adverse effect on the calcium determination.

Other problems associated with colorimetric analysis involve the stability of the reagent solution used in making the colorimetric determination and the stability of the colored calcium complexed dye. Stability of the reagent solution is important where it is desired to prepare the working solution in advance of its actual use. Stability of the colored dye-calcium complex after formation is important in permitting an accurate determination of calcium concentration where the biologic fluid is not analyzed immediately after addition of the reagent dye. In the absence of color stability, drifting of the observed colorimeter or spectrophotometer reading will occur making the accurate determination of calcium concentration difficult.

Consequently, a further object of the present invention resides in providing a reagent dye solution which can be used in colorimetrically analyzing biologic fluids and which is stable for a number of months, thus enabling its preparation and storage prior to actual use.

An additional object resides in providing a biologic fluid containing a colored dye-calcium complex wherein the color of the complex is stable for several hours after addition of the reagent dye to the fluid, thus obviating the necessity for immediate analysis of the fluid after dye addition.

Other objects and advantages of the present invention will become apparent upon reading the following detailed description.

While the invention is susceptible of various modifications and alternative constructions, there will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

Briefly stated, one embodiment of the present invention involves the use of methylthymol blue as the reagent dye for the colorimetric determination of calcium concentration in biologic fluids. The use of this dye is accompanied by a combination of unexpected and significant advantages. Methylthymol blue dye has been found to be particularly efficient in complexing with substantially all of the calcium present in the fluid. As a result, significant concentrations of proteins and phosphates do not adversely affect the accuracy of the calcium determination and dialysis to remove proteins is not needed. Similarly, the removal of bilirubin is not necessary since the characteristic maximum absorption wave length for the colored calcium-dye complex is substantially different than that of bilirubin. The use of this reagent dye also permits the addition of magnesium complexing agents to the fluid without the associated risk that calcium will be preferentially complexed therewith and detract from the accuracy of the measurement for calcium. By using methylthymol blue in accordance with the present invention, colorimetric analysis of blood serum and the like for calcium can be accomplished within about five minutes after the biologic fluid is obtained. Furthermore, the sensitivity of the process is sufficient to permit ultramicro application.

In accordance with a further aspect of the present invention, it has been found that a stable aqueous solution of methylthymol blue can be prepared by simply making the solution acidic and including therein a micelle forming protective colloid. The acidic solution is stable for at least 1 year and, accordingly, can be prepared and then stored for subsequent use.

While, as indicated above, methylthymol blue is useful for the colorimetric determination of calcium concentration, it has been noted that some fading of the color of the dye-calcium complex occurs with passage of time. In accordance with still a further feature of the present invention, it has been discovered that by adding a reducing agent to the biologic fluid containing the colored calcium-dye complex, or alternatively to a prepared aqueous reagent dye solution, this fading can be substantially delayed. The result is that the color of the sample to be analyzed is stable for as long as several hours and the necessity for immediate analysis is avoided.

Methylthymol blue is a well known chelating or metal-binding dye. The dye is commercially available generally as the pentasodium salt and for the purposes of the present invention should be used in a very pure form. In particular, no calcium or other multivalent metal impurities should be present. The amount of dye employed in accomplishing the present process should be at least equivalent to that necessary to complex with all of the calcium in the fluid to be analyzed. So long as magnesium is independently complexed with another reagent, the use of excess quantities of the dye is accompanied by no undesirable effects other than those of economics through an increasingly intense light source is required with increasing quantities of dye in order to allow the colorimeter or spectrophotometer to be set at zero absorbance when calcium is absent.

With human blood serum or plasma, the use of about $(2.4 \times 10^{-4}) - (4.0 \times 10^{-4})$ and preferably $(3 \times 10^{-4}) - (3 \times 10^{-4})$ millimole of methylthymol blue dye per 50 microliters of biologic fluid is ordinarily sufficient to permit colorimetric analysis. Since the uncomplexed dye strongly absorbs light outside of a pH range of about 10-13 analysis should be accomplished within this range. To this end, suitable buffers which function in the pH range of 10-13 and do not significantly bind calcium or form precipitates therewith can be used. Examples of useful buffers include alkyl amines such as hydroxyalkyl amines, e.g., monoethanolamine; aliphatic alkyl amines, e.g., diethylamine, triethylamine; aromatic alkyl amines, e.g., benzyl amines, 2-phenylethyl amine; and calcium free congugate acid-base pairs, e.g. ammonium ion such as from ammonium chloride, ammonium borate, or ammonium acetate and ammonia.

While the method of the present invention employing methylthymol blue dye has the decided advantage of permitting the direct colorimetric analysis of biologic fluids without the necessity for removing phosphates, bilirubin or proteins, it is preferred that, in addition to the dye, a high molecular weight, calcium free micelle-forming protective colloid also be present during analysis. Several advantages are thought to accompany the use of the colloid.

The colloid can hold lipids in solution and thus prevent interference in the absorption spectrum due to turbidity. In addition to preventing turbidity, it is believed that the use of the protective colloid is also important in eliminating errors due to the presence of proteins in the biologic fluid being analyzed. It is known that proteins can bind with dyes (unmetallized or metallized) and thereby influence the colorimetric spectrum obtained for the fluid. However, since the determination of calcium concentration is obtained by comparing the observed absorbance of the biologic fluid sample with the observed absorbance on standard protein free aqueous solutions containing known calcium concentrations, the spectral influence due to a protein-dye complex is not present in the measurement on the standard and this can result in erroneous results. The use of a protective colloid in both the fluid being analyzed and the standard is believed to minimize this potential for error. It appears that the colloid either functions to strongly bind the reagent dye itself and thereby prevent the dye from binding with protein in the biologic fluid sample or forms a colloid-dye complex in the standard having an absorbance spectrum similar to the protein-dye spectrum present in the biologic fluid.

Useful protective colloids include polyvinylpyrrolidone and non-ionic surfactants such as epoxide polymers and copolymers, e.g., polyethylene and polypropylene oxide, the 9-ethyleneoxide adduct of p-nonylphenol; polyvinyl alcohols; carbohydrate polymers; betaines; and high molecular weight anionic and cationic surfactants and polymers such as sodium dodecyl sulphate and hexadecyl trimethyl ammonium chloride or bromide, as well as mixtures thereof. Based on about 50 microliters of biologic fluid, about 4.5 – 13.5 milligrams of protective colloid are desirably employed.

Concerning magnesium, it is necessary that magnesium either be removed from the fluid prior to analysis or 104 be complexed in a manner which prevents it from complexing with the methylthymol blue dye. 8-Quinolinol is a suitable complexing agent which can be used. And, due to the exceptionally strong calcium binding power of methylthymol blue, 8-quinolinol can be used in concentrations sufficient to effectively tie up the magnesium present while not running the risk that calcium will be drawn away from the dye. With human blood serum or plasma about $3.5 \times 10^{-2} - 11.2 \times 10^{-2}$, and preferably at least about $5 \times 10^{-2}$, millimole of the complexing agent per 50 microliters of biologic fluid sample can be used.

It has also been indicated previously that a reducing agent is desirably included in the biologic fluid to be analyzed in order to stabilize the color of the calcium-dye complex. Useful reducing agents are those which function as antioxidants and include, for example, sodium sulfite and salts of hydroxylamine such as hydroxylammonium chloride. In order to effect color stabilization for extended periods on the order of several hours or more, a molar excess of the reducing agent, based on the dye, of at least several hundred times, and preferably at least about 500 times, should be used. The use of such large excesses also results in substantially the same ionic environment being present in the sample to be analyzed and in the standard solution used for calibration. In this manner, any potentially disturbing effects from the ionic atmosphere in the biologic fluid such as from the presence of proteins can be eliminated.

As indicated, the method of the present invention can be simply practiced by independently adding methylthymol blue dye and the other indicated ingredients to a sample of biologic fluid and thereafter colorimetrically analyzing it for calcium. In order to avoid inducement of protein precipitation by the added reagents, water is desirably also added to the sample. The added water should preferably be at least about 40 times, by volume, the amount of biologic fluid sample used.

While the present method can be accomplished by direct addition of reagents as above indicated, the customary procedure employed by hospitals and the like is to use pre-formulated compositions, generally aqueous solutions, containing the reagent dye and the other desired ingredients. The pre-formulated compositions are generally referred to as "diagnostic kits" and are sold by a number of chemical supply companies. The principal advantage of "diagnostic kits" is that laboratory workers such as hospital laboratory personnel do not have to be concerned with separately adding the various necessary ingredients in their proper amounts to the samples to be analyzed. The use of "diagnostic kits" speeds the analytical process and reduces the chances of obtaining incorrect results based on, for example, the use of contaminated or improper ingredients.

The problem with preparing a "diagnostic kit" with methylthymol blue dye is that the dye has been thought to be chemically unstable in aqueous solution. It has now been discovered that this is not so with respect to acidic solutions of the dye containing the above-indicated protective colloid and, preferably, also the magnesium complexing agent. These aqueous solutions of methylthymol blue can be stabilized for as long as about 1 year by maintaining the pH of the solution below about 4. Simply adding a strong acid such as hydrochloric acid or other strong acid having a water soluble calcium salt to an aqueous solution of methylthymol blue and the other ingredients in an amount to achieve the indicated pH is sufficient to obtain extended stability.

Referring still to the preparation of "diagnostic kits" for colorimetric analysis with methylthymol blue, it is desirable that the kit contain two separate pre-formulated aqueous compositions. One composition (the dye solution) contains, in aqueous solution, methylthymol blue dye, a non-ionic protective colloid, a magnesium complexing agent, and sufficient acid to stabilize the dye. The other composition (the base solution) contains, also in aqueous solution, a buffer forming amine and a reducing agent. The following compositions (reported as concentrations in one liter of distilled water) illustrate useful dye and base solutions.

Dye Solution

| Ingredient | Amount In General | Amount Preferred |
|---|---|---|
| Methylthymol blue (sodium salt) | 0.15–0.25 millimole | 0.2 millimole |
| Polyvinylpyrrolidone | 3–9 grams | 6 grams |
| Hydrochloric Acid (12 M) | 0.06–0.18 mole | 0.12 mole |
| 8-Quinolinol | 23–75 millimoles | 50 millimoles |

Base Solution

| Ingredient | Amount In General | Amount Preferred |
|---|---|---|
| Sodium Sulphite | 0.15–0.25 mole | .2 mole |
| Monoethanolamine (Density = 1.022, 20°C) | 2.8–4.2 moles | 3.7 moles |

In use, substantially equal volumes (generally about 240 milliliters) of the dye and base solution are mixed together prior to making the desired colorimetric calcium determination. About 3 milliliters of the mixed dye-base solution are conveniently used per 50 microliters of biologic fluid sample. Absorbance is read at about 612 nm wave length using well known colorimetric or spectrophotometric techniques. A calibration graph can be used to determine the actual concentration of calcium. The graph can be prepared from colorimetric determinations on standard aqueous solutions (50 microliters) containing known calcium concentrations (from 0 to about 25 milligrams of calcium per 100 milliliters of solution) to which 3 milliliters of the dye-based solution have been added. As indicated previously, the possiblility of erroneous measurements due to the presence of protein in the sample which is not present in the standard or due to ionic strength differences between the sample and standard is substantially eliminated by the technique described herein. It has been found that with the present method Beer's law is applicable up to a calcium concentration of about 12.5 milligrams per 100 milliliters of sample.

While the present invention has been particularly described with respect to the use of methylthymol blue as the reagent dye, other phenolsulphonephthaleins containing, as substituents on the phenol rings, a methylenenitrilodiacetic acid group in the 6 and 6'-positions can also be used so long as the calcium complex with the reagent dye exhibits a maximum absorbance at a wave length substantially removed from that of bilirubin which is about 420 nm. To this end, useful dyes also contain substituents in the 2, 2' and 5, 5'-positions on the phenol rings which serve to shift the maximum absorbance of the calcium dye complex to a wave length of greater than about 590 m$\mu$. The substituents employed must not themselves be capable of binding calcium.

Useful dyes can be represented as having the following structure:

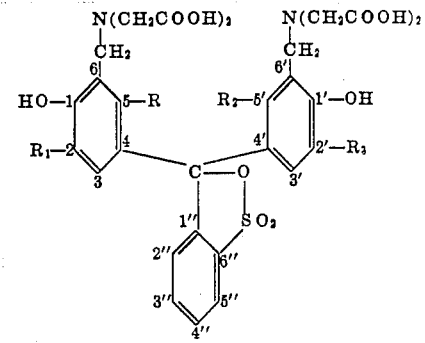

wherein R, $R_1$, $R_2$, and $R_3$ are spectrum shifting, non-calcium binding substituents. They can be individually selected from alkyl groups (e.g., methyl, ethyl, propyl, butyl, hexyl, 2-ethylhexyl, decyl, etc.) aryl groups (e.g., phenyl, halogenated phenyls such as chloro and bromo, 1 and 2 naphthyl, toluyl, pyridyl, etc.), halogen atoms (e.g., Cl, Br), and oxygen, sulfur, and/or nitrogen containing groups such as ethers (methoxy, ethoxy), thioethers (methylthio ether), sulfoxide (methyl or phenyl sulfoxide), sulfonamide, amines (dimethylamino) amide carboxy. Dyes wherein the substituents are lower alkyl groups (e.g., less than about 10 carbon atoms) are thought to be most useful. The most readily available of these are methylthymol blue (R and $R_2$ are $CH_3-$ and $R_1$ and $R_3$ are $(CH_3)_2$ CH– ) and methylxylenol blue (R, $R_1R_2$, and $R_3$ are $CH_3-$ ).

In addition, one or more of the above substituents may be in the 2″, 3″, 4″ and/or 5″ positions of the sulfo carboxylic acid-derived ring. The sulfo carboxylic acid-derived ring may itself be part of a naphthalene or other isocyclic group or may even be heterocyclic, such as pyridine or quinoxaline. It is even possible that in place of the sulfo carboxylic acid-derived ring there may be a linear group derived from 3-sulfo-acrylic acid.

I claim:

1. In a colorimetric process for determining the concentration of calcium in a biologic fluid containing proteins, phosphates, and bilirubin comprising
   I. adding a reagent dye to the biologic fluid which forms a colored complex having a characteristic wave length of maximum light absorption with the calcium present in said fluid while preventing said dye from forming colored complexes with other multivalent metal ions present in said fluid,
   II. exposing said fluid containing the colored calcium-dye complex to light having the characteristic wave length of maximum absorption for the complex while maintaining the pH of said fluid at a valve where the uncomplexed dye does not absorb light of the characteristic wave length,
   III. measuring the degree of light absorption at said characteristic wave length, and
   IV. determining the calcium concentration in said fluid by comparing the measured degree of light absorption with values of light absorption obtained from standard aqueous solutions containing the reagent dye and known calcium concentrations; the improvement wherein said reagent dye is a phenol-sulphonephthalein containing methylenenitrilodiacetic acid group substituents in the 6 and 6′-positions on the phenol rings and non-calcium binding substituents in the 2,2′ and 5, 5′-positions thereon, said 2, 2′ and 5, 5′-position substituents shifting the characteristic wave length of maximum light absorption of the calcium complexed phenol-sulphonephthalein to greater than about 590 nm thereby permitting the accurate determination of calcium concentration in the presence of substantial quantities of bilirubin.

2. The process of claim 1 wherein, before colorimetric analysis, 8-quinolinol is added to the biologic fluid in an amount sufficient to complex with magnesium present therein.

3. The process of claim 1 wherein, before colorimetric analysis, a high molecular weight, calcium free micelle forming protective colloid is added to the biologic fluid to hold lipids in solution.

4. The process of claim 3 wherein the protective colloid is selected from polyvinylpyrrolidone and epoxide copolymers.

5. The process of claim 1 wherein, before colorimetric analysis, a reducing agent is added to the biologic fluid to stabilize the color of the calcium-dye complex.

6. The process of claim 5 wherein the reducing agent is sodium sulfite.

7. The process of claim 1 wherein during colorimetric analysis the pH of the biologic fluid is maintained at about 10–13 with monoethanol amine.

8. The process of claim 1 wherein the reagent dye is selected from methylthymol blue and methylxylenol blue.

9. The process of claim 8 wherein, before colorimetric analysis, 8-quinolinol is added to the biologic fluid in an amount sufficient to complex with magnesium present therein and a high molecular weight, calcium free micelle forming protective colloid is added to the biologic fluid to hold lipids in solution.

10. The process of claim 9 wherein the protective colloid is selected from polyvinylpyrrolidone and epoxide copolymers.

11. The process of claim 10 wherein a reducing agent is added to the biologic fluid to stabilize the color of the calcium-dye complex.

12. The process of claim 11 wherein the reducing agent is sodium sulfite.

13. The process of claim 12 wherein during colorimetric analysis of pH of the biologic fluid is maintained at about 10–13 with monoethanol amine.

14. The process of claim 13 wherein the protective colloid is polyvinylpyrrolidone.

15. The process of claim 14 wherein the standard aqueous solutions containing known calcium concentrations also contain the reagent dye, the polyvinylpyrrolidone protective colloid and the sodium sulfite reducing agent in concentrations substantially the same as those present in the biologic fluid being analyzed.

16. A stable aqueous dye solution useful in the colorimetric determination of calcium in biologic fluids, said solution consisting essentially of (A) water, (B) a reagent dye of phenol-sulphonephthalein containing methylenenitrilodiacetic acid group substituents in the 6, 6′-positions on the phenol rings and non-calcium binding substituents in the 2,2′ and 5,5,′-positions thereon with said 2, 2′ and 5, 5′-position substituents serving to shift the characteristic wave length of maximum light absorption of the dye when complexed with a calcium to greater than about 590 nm., (C) a high molecular weight calcium free, micelle forming non-ionic protective colloid, and (D) an acid having a water soluble calcium salt, the acid being present in an amount sufficient to give a solution pH of less than about 4.

17. The dye solution of claim 16 wherein the protective colloid is selected from polyvinylpyrrolidone, and expoxide copolymers.

18. The dye solution of claim 17 wherein the reagent dye is selected from methylthymol blue and methylxylenol blue and, based on one litter of solution, the protective colloid is present in an amount of about 3–9 grams and the reagent dye is present in an amount of about 0.15–0.25 millimole.

19. The dye solution of claim 18 wherein the protective colloid is polyvinylpyrrolidone and the reagent dye is methylthymol blue.

20. The dye solution of claim 19 wherein the acid is hydrochloric acid.

21. The dye solution of claim 16 containing in addition to the recited ingredients a magnesium complexing agent.

22. The dye solution of claim 21 wherein the magnesium complexing agent is 8-quinolinol.

23. The dye solution of claim 22 wherein, per liter of solution, 8-quinolinol is present in an amount of about 23–75 millimoles.

24. The dye solution of claim 23 wherein the protective colloid is selected from polyvinylpyrrolidone, and epoxide copolymers.

25. The dye solution of claim 24 wherein the reagent dye is selected from methylthymol blue and methylxylenol blue and, based on one liter of solution, the protective colloid is present in an amount of about 3–9 grams and the reagent dye is present in an amount of about 0.15–0.25 millimole.

26. The dye solution of claim 25 wherein the protective colloid is polyvinylpyrrolidone and the reagent dye is methylthymol blue.

27. The dye solution of claim 26 wherein the acid is hydrochloric acid.

28. The process of claim 1 wherein the reagent dye is methylthymol blue.

* * * * *